United States Patent
Pijlman et al.

(10) Patent No.: US 9,726,898 B2
(45) Date of Patent: Aug. 8, 2017

(54) AUTOSTEREOSCOPIC DISPLAY DEVICE

(75) Inventors: Fetze Pijlman, Eindhoven (NL); Siebe Tjerk De Zwart, Eindhoven (NL); Marcellinus Petrus Carolus Michael Krijn, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 95 days.

(21) Appl. No.: 13/380,409

(22) PCT Filed: Jun. 21, 2010

(86) PCT No.: PCT/IB2010/052780
§ 371 (c)(1),
(2), (4) Date: Dec. 23, 2011

(87) PCT Pub. No.: WO2010/150166
PCT Pub. Date: Dec. 29, 2010

(65) Prior Publication Data
US 2012/0099034 A1   Apr. 26, 2012

(30) Foreign Application Priority Data

Jun. 26, 2009   (EP) .................................... 09163866

(51) Int. Cl.
*G02B 27/22*   (2006.01)
*G02B 3/12*   (2006.01)
(Continued)

(52) U.S. Cl.
CPC ..... *G02B 27/2214* (2013.01); *H04N 13/0404* (2013.01); *H04N 13/0454* (2013.01);
(Continued)

(58) Field of Classification Search
CPC .................................................. G02B 27/2214
(Continued)

(56) References Cited

U.S. PATENT DOCUMENTS

| 5,532,852 A * | 7/1996 | Kalmanash ................. 349/117 |
| 6,069,650 A | 5/2000 | Battersby |

(Continued)

FOREIGN PATENT DOCUMENTS

| GB | 2398130 A | 8/2004 |
| GB | 2403815 A | 1/2005 |

*Primary Examiner* — Nathanael R Briggs
*Assistant Examiner* — Alexander Gross

(57) ABSTRACT

A switchable autostereoscopic display device includes a display panel having an array of display pixels for producing a display, and a lens arrangement for directing the output from different pixels to different spatial positions to enable a stereoscopic image to be viewed. The lens arrangement is in a plane parallel to the display panel and includes an electrically switchable LC layer which defines a lens pattern or a lens replica pattern. The LC alignment of the LC layer is electrically switchable such that the lens arrangement is switchable between 2D and 3D modes. In the 2D mode, the LC alignment is in a first direction substantially within the plane of the lens arrangement; and in the 3D mode, the LC alignment is in a second, perpendicular direction also substantially within the plane of the lens arrangement. The light output of the display panel is polarized in the second direction.

10 Claims, 5 Drawing Sheets

(51) Int. Cl.
*G02F 1/1335* (2006.01)
*H04N 13/04* (2006.01)
(52) U.S. Cl.
CPC .......... *G02B 3/12* (2013.01); *G02F 1/133526* (2013.01); *H04N 13/0402* (2013.01)
(58) Field of Classification Search
USPC .......................................................... 349/15
See application file for complete search history.

(56) References Cited

U.S. PATENT DOCUMENTS

| | | |
|---|---|---|
| 6,943,788 B2 | 9/2005 | Tomono |
| 2004/0222945 A1 | 11/2004 | Taira |
| 2006/0098296 A1* | 5/2006 | Woodgate et al. ........... 359/642 |
| 2007/0035672 A1 | 2/2007 | Shestak |
| 2007/0296896 A1* | 12/2007 | Hong et al. ................... 349/122 |
| 2008/0013002 A1* | 1/2008 | Hong et al. ..................... 349/15 |
| 2008/0259233 A1 | 10/2008 | Krijn |
| 2009/0052026 A1 | 2/2009 | Takagi |
| 2009/0116108 A1* | 5/2009 | Levecq .............. G02B 27/2214 359/463 |
| 2009/0257013 A1* | 10/2009 | Sakai et al. ................... 349/124 |

* cited by examiner

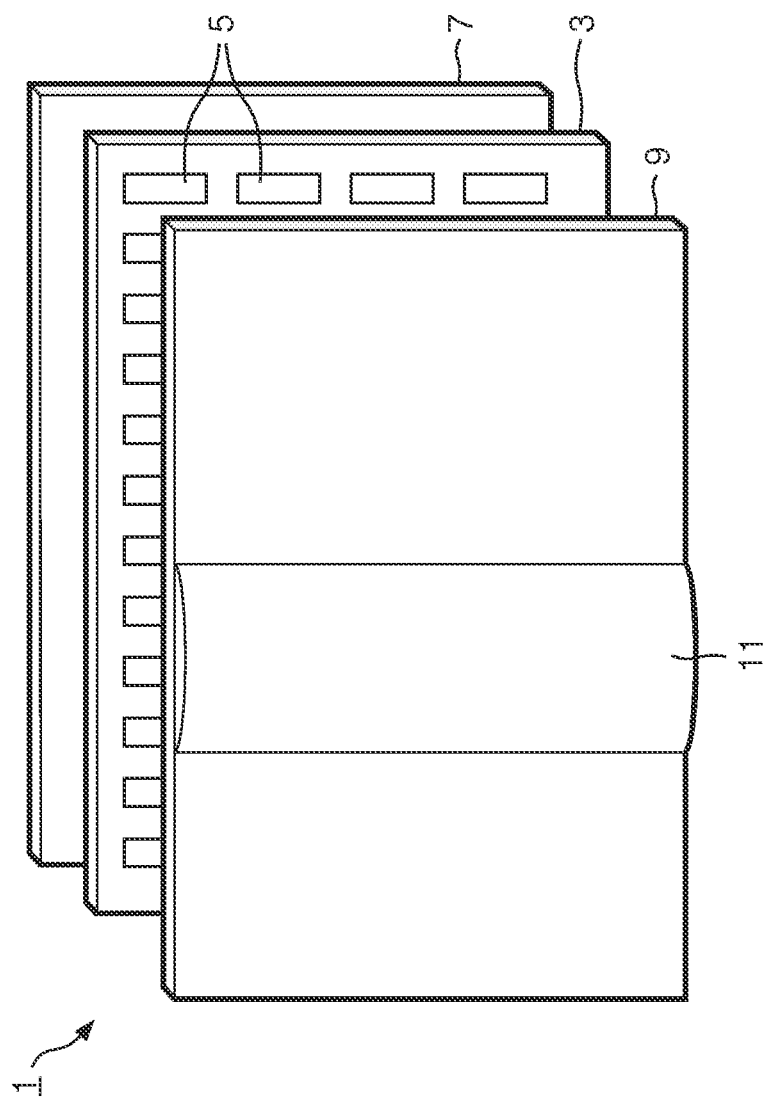

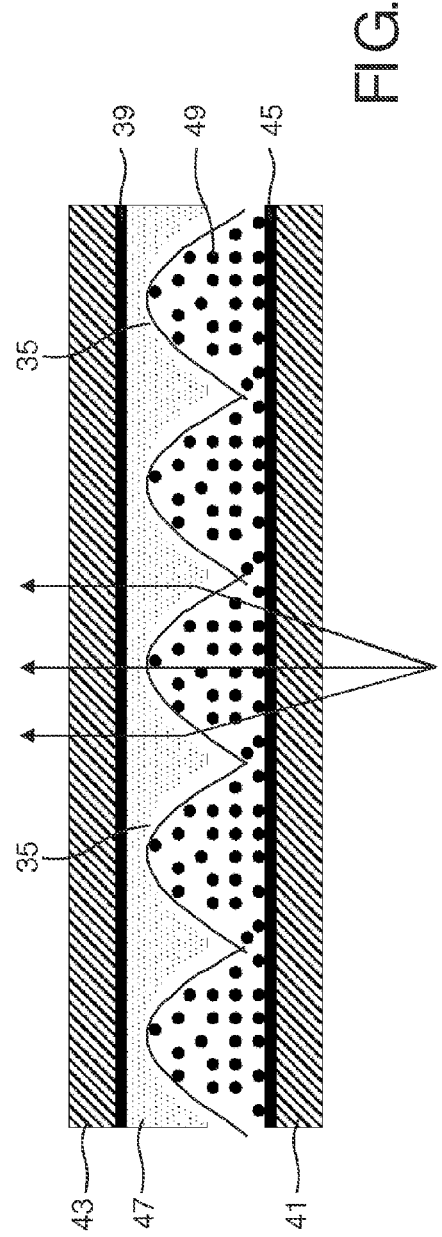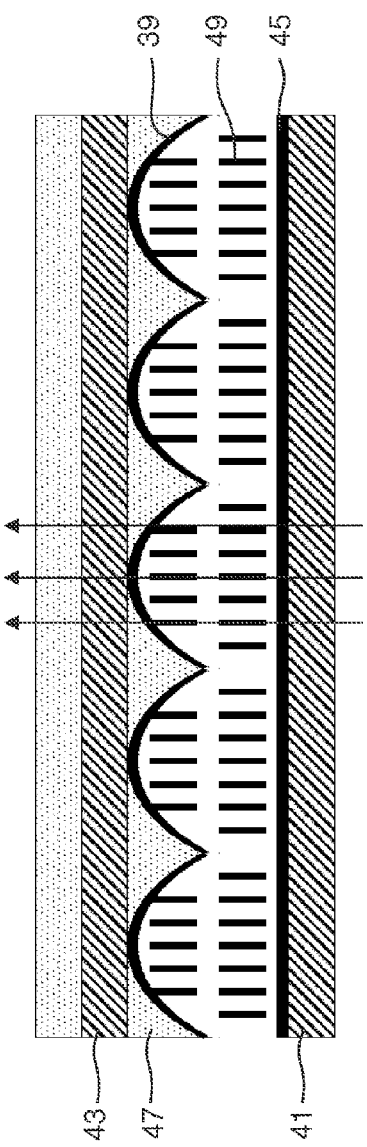

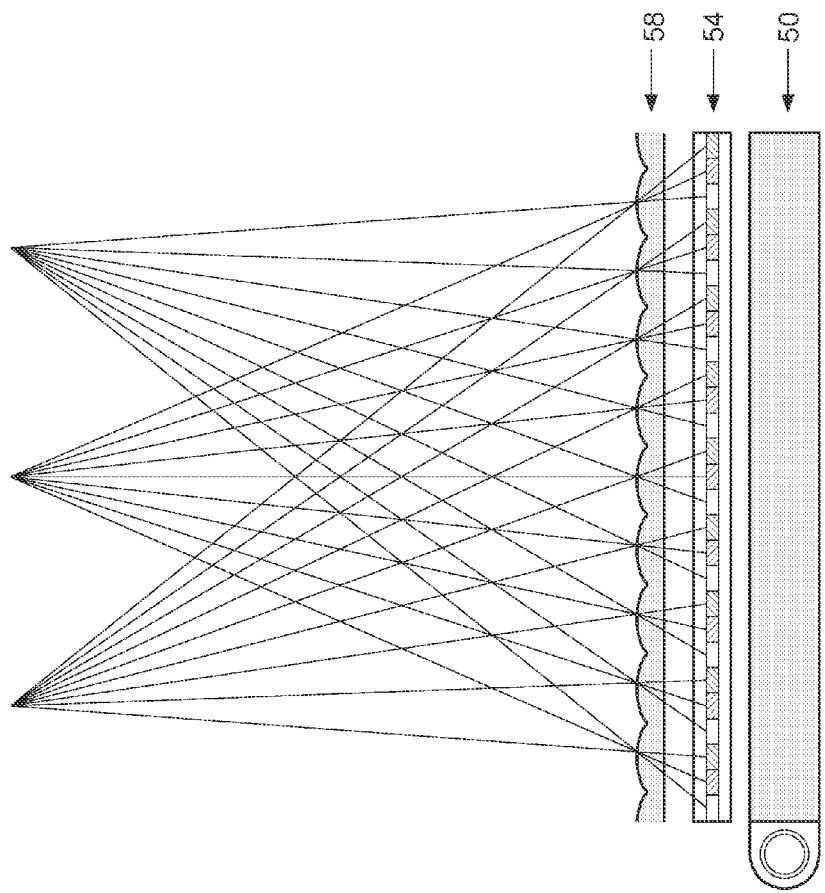

AUTOSTEREOSCOPIC DISPLAY DEVICE

FIELD OF THE INVENTION

This invention relates to an autostereoscopic display device of the type that comprises a display panel having an array of display pixels for producing a display and an imaging arrangement for directing different views to different spatial positions.

BACKGROUND OF THE INVENTION

A first example of imaging arrangement for use in this type of display is a barrier, for example with slits that are sized and positioned in relation to the underlying pixels of the display. The viewer is able to perceive a 3D image if his/her head is at a fixed position. The barrier is positioned in front of the display panel and is designed so that light from the odd and even pixel columns is directed towards the left and right eye of the viewer.

A drawback of this type of two-view display design is that the viewer has to be at a fixed position, and can only move approximately 3 cm to the left or right. In a more preferred embodiment there are not two sub-pixel columns beneath each slit, but several. In this way, the viewer is allowed to move to the left and right and perceive a stereo image in his eyes all the time.

The barrier arrangement is simple to produce but is not light efficient. A preferred alternative is therefore to use a lens arrangement as the imaging arrangement. For example, an array of elongate lenticular elements can be provided extending parallel to one another and overlying the display pixel array, and the display pixels are observed through these lenticular elements.

The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

If each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image. The sheet of lenticular elements thus provides a light output directing function.

In other arrangements, each lenticule is associated with a group of four or more adjacent display pixels in the row direction. Corresponding columns of display pixels in each group are arranged appropriately to provide a vertical slice from a respective two dimensional sub-image. As a user's head is moved from left to right, a series of successive, different, stereoscopic views are perceived creating, for example, a look-around impression.

The above described device provides an effective three dimensional display. However, it will be appreciated that, in order to provide stereoscopic views, there is a necessary sacrifice in the horizontal resolution of the device. This sacrifice in resolution is unacceptable for certain applications, such as the display of small text characters for viewing from short distances. For this reason, it has been proposed to provide a display device that is switchable between a two-dimensional mode and a three-dimensional (stereoscopic) mode.

One way to implement this is to provide an electrically switchable lenticular array. In the two-dimensional mode, the lenticular elements of the switchable device operate in a "pass through" mode, i.e. they act in the same way as would a planar sheet of optically transparent material. The resulting display has a high resolution, equal to the native resolution of the display panel, which is suitable for the display of small text characters from short viewing distances. The two-dimensional display mode cannot, of course, provide a stereoscopic image.

In the three-dimensional mode, the lenticular elements of the switchable device provide a light output directing function, as described above. The resulting display is capable of providing stereoscopic images, but has the inevitable resolution loss mentioned above.

In order to provide switchable display modes, the lenticular elements of the switchable device are formed of an electro-optic material, such as a liquid crystal material, having a refractive index that is switchable between two values. The device is then switched between the modes by applying an appropriate electrical potential to planar electrodes provided above and below the lenticular elements. The electrical potential alters the refractive index of the lenticular elements in relation to that of an adjacent optically transparent layer. A more detailed description of the structure and operation of the switchable device can be found in U.S. Pat. No. 6,069,650.

A disadvantage of an LC-lenticular switchable display is that there is still a lens action in the 2D mode, particularly when looking at the display from a position that is either above or below the normal to the display screen. This gives rise to undesirable image artefacts.

SUMMARY OF THE INVENTION

It is an object of the invention to provide an autostereoscopic display device that is improved with respect to the aforementioned problem of lens action in the 2D mode.

This object is achieved with a device according to the invention.

The invention is defined by the independent claims. The dependent claims define advantageous embodiments.

According to the invention, there is provided a switchable autostereoscopic display device comprising:

a display panel having an array of display pixels for producing a display, the display pixels being arranged in rows and columns; and a lens arrangement for directing the output from different pixels to different spatial positions to enable a stereoscopic image to be viewed, the lens arrangement being in a plane parallel to the display panel;

wherein the lens arrangement comprises an electrically switchable LC layer which defines a lens pattern or a lens replica pattern, wherein the LC alignment of the LC layer is electrically switchable such that the lens arrangement is switchable between a 2D mode and a 3D mode, wherein in the 2D mode, the LC alignment is in a first direction substantially within the plane of the lens arrangement, and in the 3D mode the LC alignment is in a second, perpendicular direction also substantially within the plane of the lens arrangement, and wherein the light output of the display panel is polarized in the second direction.

In this arrangement, the LC molecule alignment of the switchable lens device lies within the plane of the display. This arrangement enables a perpendicular relationship between the polarization of the output of the display panel and the LC alignment direction to be maintained for display viewing directions in two planes perpendicular to plane of the display.

In one arrangement, the light output of the display panel is polarized along the row or column direction of the display.

Thus, the display output polarization and the LC alignment direction are in the same plane. This means that the desired 90 degree angle between the polarization direction and the optical axis of the liquid crystal can be substantially independent of the light output direction in the horizontal (row) and vertical (column) planes.

In another arrangement, the lens arrangement comprises an array of elongate lenses, wherein the light output of the display panel is polarized along or perpendicular to the elongate lens axis.

Again, the display output polarization and the LC alignment direction are in the same plane. The desired 90 degree angle between the polarization direction and the optical axis of the liquid crystal are independent of the light output direction for planes parallel to and perpendicular to the lens axis. For small slant angles, this means the desired 90 degree angle is again substantially independent of the light output direction in the horizontal and vertical planes.

In one arrangement, the first (2D) direction is perpendicular to the lens axis and the second direction is parallel to the lens axis, the light output of the display panel is polarized in a direction parallel to the lens axis, and wherein the lens arrangement is electrically switched to the 2D mode. In the 2D mode, the polarization direction is along the lenses and the LC alignment is across the lenses. The 3D mode is then obtained based on the steady state LC alignment of the lens arrangement.

The lens arrangement can comprise switching electrodes parallel to the lens axis for generating an in-plane electric field across the lenses, in order to implement the switching to the 2D mode.

In another arrangement, the first direction is perpendicular to the lens axis and the second direction is parallel to the lens axis, the light output of the display panel is polarized in a direction parallel to the lens axis, and wherein the lens arrangement is electrically switched to the 3D mode. Again, in the 2D mode for this implementation, the polarization direction is along the lenses and the LC alignment is across the lenses. However, 2D mode is obtained based on the steady state LC alignment of the lens arrangement.

The lens arrangement can comprise switching electrodes perpendicular to the lens axis for generating an in-plane electric field along the lenses, in order to implement the switching to the 3D mode.

The display panel can comprise an array of individually addressable emissive, transmissive, refractive or diffractive display pixels, for example it can comprise a liquid crystal display panel.

The invention also provides a method of controlling an autostereoscopic display device comprising a display panel and a switchable lens arrangement for directing the display panel output to different spatial positions to enable a stereoscopic image to be viewed, the method comprising:

selecting between a 2D mode and a 3D mode, wherein in the 2D mode, the LC alignment is in a first direction substantially within the plane of the lens arrangement, and in the 3D mode the LC alignment is in a second, perpendicular direction also substantially within the plane of the lens arrangement;

electrically switching the lens arrangement to provide the selected mode of operation; and driving the display panel to provide a display output suitable for the selected mode, wherein the display output is controlled to be polarized in the second direction.

BRIEF DESCRIPTION OF THE DRAWINGS

Embodiments of the invention will now be described, purely by way of example, with reference to the accompanying drawings, in which:

FIG. 1 is a schematic perspective view of a known autostereoscopic display device;

FIGS. 2 and 3 are used to explain the operating principle of the lens array of the display device shown in FIG. 1;

FIG. 4 shows how a lenticular array provides different views to different spatial locations;

DETAILED DESCRIPTION OF THE EMBODIMENTS

Figure 5:
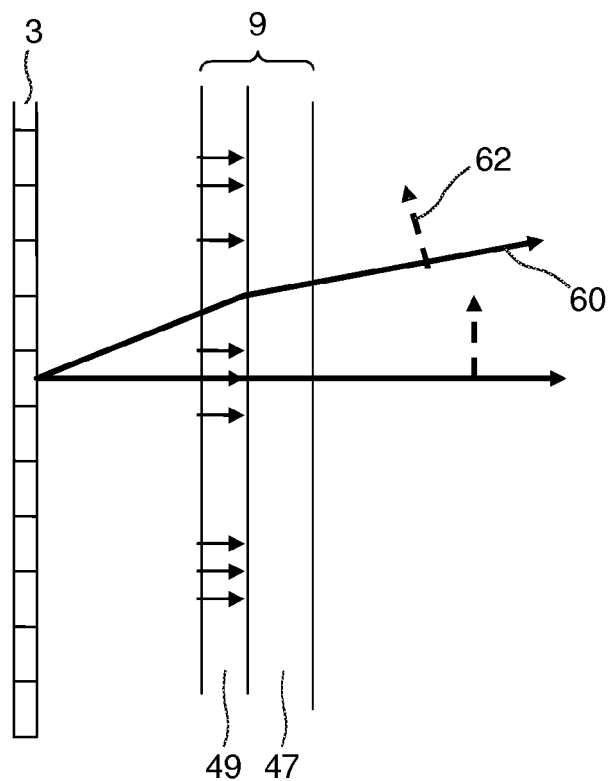
FIG. 5 is used to explain the problem associated with known designs, and which is addressed by this invention.

The invention provides a switchable autostereoscopic display device in which the optical axis of the switchable LC material of a switchable lens arrangement is switchable between two orthogonal directions, each within a plane parallel to the plane of the display panel. This enables a lens effect to be avoided when in the 2D mode, in two viewing planes that are perpendicular to the display.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of display pixels 5 arranged in rows and columns. For the sake of clarity, only a small number of display pixels 5 are shown in the Fig. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements 11 extending parallel to one another, of which only one is shown with exaggerated dimensions for the sake of clarity.

The lenticular elements 11 are in the form of convex cylindrical lenses, and they act as a light output directing means to provide different images, or views, from the display panel 3 to the eyes of a user positioned in front of the display device 1.

The autostereoscopic display device 1 shown in FIG. 1 is capable of providing several different perspective views in different directions. In particular, each lenticular element 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn.

It has been proposed to provide electrically switchable lens elements, as mentioned above. This enables the display to be switched between 2D and 3D modes.

FIGS. 2 and 3 schematically show an array of electrically switchable lenticular elements 35 which can be employed in the device shown in FIG. 1. The array comprises a pair of transparent glass substrates 39, 41, with transparent electrodes 43, 45 formed of indium tin oxide (ITO) provided on their facing surfaces. An inverse lens structure 47, formed using a replication technique, is provided between the substrates 39, 41, adjacent to an upper one of the substrates 39. Liquid crystal material 49 is also provided between the substrates 39, 41, adjacent to the lower one of the substrates 41.

The inverse lens structure 47 causes the liquid crystal material 49 to assume parallel, elongate lenticular shapes, between the inverse lens structure 47 and the lower substrate 41, as shown in cross-section in FIGS. 2 and 3. Surfaces of the inverse lens structure 47 and the lower substrate 41 that are in contact with the liquid crystal material are also provided with an orientation layer (not shown) for orientating the liquid crystal material.

FIG. 2 shows the array when no electric potential is applied to the electrodes 43, 45. In this state, the refractive index of the liquid crystal material 49 is substantially higher than that of the inverse lens array 47, and the lenticular shapes therefore provide a light output directing function, as illustrated.

FIG. 3 shows the array when an alternating electric potential of approximately 50 to 100 volts is applied to the electrodes 43, 45. In this state, the refractive index of the liquid crystal material 49 is substantially the same as that of the inverse lens array 47, so that the light output directing function of the lenticular shapes is cancelled, as illustrated. Thus, in this state, the array effectively acts in a "pass through" mode.

Further details of the structure and operation of arrays of switchable lenticular elements suitable for use in the display device shown in FIG. 1 can be found in U.S. Pat. No. 6,069,650.

FIG. 4 shows the principle of operation of a lenticular type imaging arrangement as described above and shows the backlight 50, display device 54 such as an LCD and the lenticular array 58. FIG. 4 shows how the lenticular arrangement 58 directs different pixel outputs to different spatial locations.

This invention relates specifically to the way the display output interacts with the lens arrangement LC layer, and particularly the alignment of the LC layer and the polarization of the display output.

In the known arrangement shown in FIGS. 2 and 3, the linear polarization direction of the display panel is in the direction of the elongate axis of the lenses, namely into the page for FIGS. 2 and 3.

Thus, the display output polarization and the LC alignment of the lens arrangement are parallel in FIG. 2 and perpendicular in FIG. 3. Furthermore, this parallel and perpendicular relationship is maintained for lateral viewing angles, i.e. light path directions which are to the left and right of the normal direction in FIGS. 2 and 3.

A disadvantage of this arrangement is that there is a lens action in the 2D mode when viewing from a position that is either above or below the display with reference to a normal direction. This effect is shown in FIG. 5, which shows a side view of the system in the 2D mode. Rays 60 that are not parallel with the normal to the display experience a different index of refraction in the LC material, which is therefore no longer matched with the refractive index of the replica. This is due to the fact that the polarization (shown by arrows 62) is no longer completely perpendicular to the alignment of the LC layer within the lens arrangement. The result is a lens action, giving rise to visible artefacts. This lens action in the 2D mode is not desired.

The invention provides an arrangement in which the optical alignment axis of the birefringent LC material in the 2D mode is aligned substantially parallel to the plane of the display. The polarization of the display is also substantially in the plane of the display and perpendicular to the optical axis of the LC. This combination leads to an improved viewing experience in the 2D mode. The optical alignment axis is the LC molecule alignment direction, and this is collinear with the vector that indicates the extra-ordinary refractive axis of the LC material.

For the 3D mode, the refractive index of the LC that is seen by the polarized light of the display needs to be different from the 2D mode. This is achieved by rotating the LC alignment axis around the normal of the display. Thus, the optical alignment axis of the LC layer of the lens arrangement is parallel to the plane of the display for both modes. For the switching between modes, known in-plane-switching technology can be used.

Figure 6:
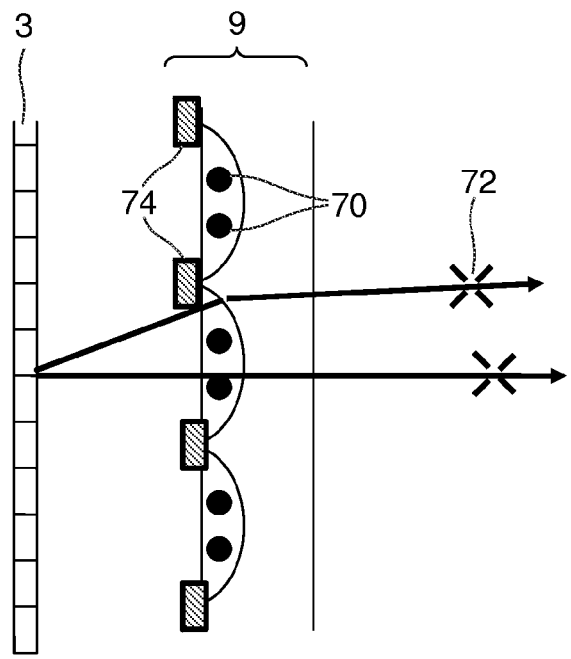
FIG. 6 shows a first example of display device of the invention.

FIG. 6 shows a first embodiment, and shows a top view of the system when in the 3D mode. In this example, the 3D mode is the steady state mode in which no voltage is applied to the electrodes.

In this arrangement, the LC alignment in the steady state 3D mode is parallel to the lens axis (shown by dots 70), and the light output of the display panel is polarized in a direction parallel to the lens axis (shown as 72).

The advantage of this alignment arrangement is that the alignment will be substantially the same in the whole lens.

The lens arrangement comprises switching electrodes 74 parallel to the lens axis for generating an in-plane electric field across the lenses.

When a voltage is applied to the electrodes, the LC molecules rotate around the normal of the display and the display is then in the 2D mode. The optical axis is then across the lenses. However, even if the direction of a light path is above or below the normal, the polarization direction 72 remains perpendicular to the optical axis, so that the problem of a lensing action in the 2D mode is avoided for two perpendicular planes.

Figure 7:
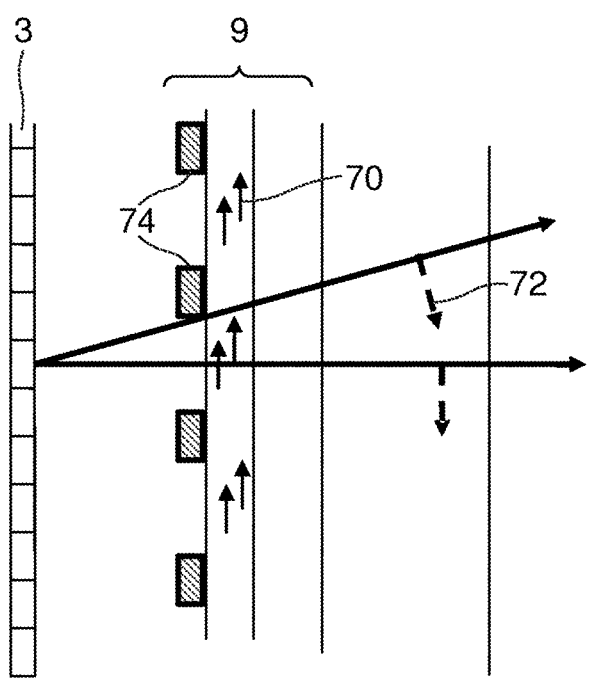
FIG. 7 shows a second example of display device of the invention.

FIG. 7 shows a second embodiment in which the role of the alignment layer and electrodes is interchanged. FIG. 7 shows a side view.

The alignment layer is arranged such that the LC aligns horizontally over the display in the steady state (no voltage) condition. The polarization of the display is again chosen to be parallel to the lens axis, i.e. in the plane of FIG. 7. FIG. 7 shows the condition with the voltage applied, which in this case is the 3D mode. In this arrangement, the LC alignment in the steady state 2D mode is perpendicular to the lens axis.

The lens arrangement comprises switching electrodes 74 perpendicular to the lens axis for generating an in-plane electric field along the lenses.

The electrodes are thus arranged in an array that is crossed by the array of lenses.

The electrode arrangement provides an in-plane electric field, so that the optical axis is in a plane parallel to the display panel. However, a perfect electric field pattern is not possible, particularly as the electrodes are positioned at one surface of the LC layer (rather than at edges of the layer). The electric field lines will initially penetrate into the LC layer at an angle to the normal, then curve round to the next electrode. At the mid-point between electrodes, the electric field lines will be parallel to the display panel plane. This region can be selected to correspond to the main central part of the lenses. References to the optical axis being "substantially" in a plane parallel to the display should be understood in this context. In particular, the electric field lines extend between points (the electrodes) which are in a plane parallel to the display panel plane, but the path will not in practice be a straight direct line. However, the contrast with transverse electric field line extending through the thickness of the LC layer will be clearly appreciated. The optical axis being substantially parallel to the display panel plane is achieved by in-plane switching of the LC material. Thus, an alternative definition of the parallel optical axis of the electrically switched mode is that the electric field used for switching between modes is generated by an in-plane switching electrode arrangement.

The optical alignment for the steady state condition, which again aims to be in the same plane, will be implemented with optical alignment layers, in conventional manner. For example, the material of a polyimide alignment layer can be AL-1051

The invention can be applied to arrangements using slanting lenticular lenses. It is known that by slanting the lenticular, it is possible to distribute the resolution loss among the horizontal and vertical directions. In practice, this improves the perceived image quality significantly.

The invention requires the display polarization direction and the LC optical alignment of the lens arrangement to be perpendicular in one of the two modes, and parallel in the other of the two modes. The two optical alignment directions of the lens arrangement can be along and across the slanted lens direction or in the row and column directions. The polarization direction of the display output is selected to be parallel to one on these.

Preferably, the 2D mode is kept as free from visual artefacts as possible when the viewer moves laterally or up-and-down from a central normal position to the display. This is because these are the natural likely movements of the viewer. This is achieved by having the polarization of the display in the row or column direction, or else along or perpendicular to the lens axis—if the slant angle is small.

However, it will be understood that any pair of orthogonal directions in the plane of the display panel can be chosen for the two modes of the lens arrangement LC layer, providing the display output polarization is parallel to one of these. This arrangement will always give two planes of movement in which visual artefacts in the 2D mode are kept to a minimum. There is also an improvement of the 2D mode for other viewing positions. The preferred arrangement of the two planes being (exactly or approximately) lateral and up-down is only one possibility within the scope of the invention.

The electrodes can have the same pitch as the lenses, and as mentioned above the central part of the lens can then be associated with the best electric field line direction. However, the number of electrodes may the different from the number of lenses. There is clearly no requirement for the lenses and electrodes to correspond in the second embodiment above, where the electrodes cross the lenses.

The switchable LC layer has been shown above as the lens part. However, the lens replica may be the switchable part.

Uni-axial liquid crystals are described by the extra-ordinary index of refraction and the ordinary index of refraction. The refractive index of the replica is close to the ordinary refractive index of the liquid crystal. In the case that the ordinary index of refraction is larger than the extra-ordinary index of refraction, the lens surface of the replica should have a positive lens shape.

The examples described above employ a liquid crystal display panel having, for example, a display pixel pitch in the range 50 µm to 1000 µm. However, it will be apparent to those skilled in the art that alternative types of display panel may be employed, such as organic light emitting diode (OLED) or cathode ray tube (CRT) display devices. The output of the display needs to be polarized, and additional polarizers can be provided for display technologies that do not have polarized outputs.

The manufacture and materials used to fabricate the display device have not been described in detail, as these will be conventional and well known to those skilled in the art.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A switchable autostereoscopic display device comprising:
    a display panel having an array of display pixels configured to produce a display, the display pixels being arranged in horizontal rows and vertical columns; and
    a lens arrangement configured to direct an output from different pixels to different spatial positions to enable a stereoscopic image to be viewed, the lens arrangement being in a plane parallel to the display panel;
    wherein the lens arrangement comprises an electrically switchable liquid crystal (LC) layer which defines a lens pattern or a lens replica pattern, wherein LC alignment of the LC molecules of the LC layer is electrically switchable such that the lens arrangement is switchable between a 2D mode and a 3D mode, wherein in the 2D mode, the LC alignment is in a first direction substantially within the plane of the lens arrangement, and in the 3D mode the LC alignment is in a second direction rotated around a normal of the display panel to remain substantially within the plane of the lens arrangement, the first direction of the LC alignment being perpendicular to the second direction of the LC alignment and being within the plane of the lens arrangement parallel to the display panel, wherein the lens arrangement comprises switching electrodes that are perpendicular to a lens axis of the lens arrangement for generating an in-plane electric field along the lenses.

2. The device as claimed in claim 1, wherein the display panel comprises an array of individually addressable emissive, transmissive, refractive or diffractive display pixels.

3. The device as claimed in claim 2 wherein the display panel is a liquid crystal display panel.

4. The device of claim 1, wherein in the 3D mode, the LC alignment is parallel to a lens axis of the lens arrangement.

5. The device of claim 1, wherein the lens arrangement is slanted with respect to the array of display pixels.

6. The device of claim 1, wherein the lens arrangement comprises a sheet of lenticular lenses.

7. A method of controlling an autostereoscopic display device comprising a display panel and a switchable lens arrangement having an electrically switchable liquid crystal (LC) layer including LC molecules and being configured to direct light output of the display panel to different spatial positions to enable a stereoscopic image to be viewed, the method comprising acts of:

selecting between a 2D mode and a 3D mode, wherein in the 2D mode, LC alignment of the LC molecules is in a first direction substantially within a plane of the lens arrangement, and in the 3D mode the LC alignment is in a second, perpendicular direction also substantially within the plane of the lens arrangement;

electrically switching the LC alignment to rotate an axis of the LC molecules around a normal of the display panel so that the LC alignment remains substantially within the plane of the lens arrangement to provide the selected mode of operation; and driving the display panel to provide the light output suitable for the selected mode, wherein the lens arrangement comprises switching electrodes that are perpendicular to a lens axis of the lens arrangement for generating an in-plane electric field along the lenses.

8. The method of claim 7, wherein in the 3D mode, the LC alignment is parallel to a lens axis of the lens arrangement.

9. The method of claim 7, wherein the lens arrangement is slanted with respect to the display panel.

10. The method of claim 7, wherein the lens arrangement comprises a sheet of lenticular lenses.

* * * * *